United States Patent [19]
Nelligan

[11] Patent Number: 4,973,839
[45] Date of Patent: Nov. 27, 1990

[54] METHOD AND APPARATUS FOR EPITHERMAL NEUTRON DECAY LOGGING

[75] Inventor: William B. Nelligan, North Bay Village, Fla.

[73] Assignee: Schlumberger Technology Corporation, New York, N.Y.

[21] Appl. No.: 327,854

[22] Filed: Mar. 23, 1989

[51] Int. Cl.$^5$ .............................................. G01V 5/00
[52] U.S. Cl. .................................. 250/269; 250/390.04
[58] Field of Search ............... 250/269, 264, 266, 267, 250/262, 390.1, 340.04

[56] References Cited

U.S. PATENT DOCUMENTS

| | | | |
|---|---|---|---|
| 2,991,364 | 7/1961 | Goodman | 250/83.3 |
| 3,497,692 | 2/1970 | Mills, Jr. | 250/83.1 |
| 3,546,512 | 12/1970 | Frentrop | 313/61 |
| 4,283,624 | 8/1981 | Mills, Jr. | 250/264 |
| 4,302,669 | 11/1981 | Allen et al. | 250/264 |

OTHER PUBLICATIONS

Nelligan et al., "Molecular Spectroscopy of n-Butane by Incoherent Inelastic Neutron Scattering", *Nuclear Instruments and Methods in Physics Reserch*, A254 (1987), 563–569, North-Holland, Amsterdam.

Nelligan et al., "Inelastic Neutron Scattering Study of the Torsional and CCC Bend Frequencies in the Solid n-Alkanes, Ethane-Hexane", *J. Chem. Phys.*, 87 (5), Sept. 1, 1987, pp. 2447–2456.

*Primary Examiner*—Janice A. Howell
*Assistant Examiner*—Richard Hanig
*Attorney, Agent, or Firm*—Brumbaugh, Graves, Donohue & Raymond

[57] ABSTRACT

The nature of hydrogenous fluids filling the pore spaces in formations surrounding a well bore are determined by irradiating the formation with bursts of high energy neutrons and using the ratio of time-dependent parameters related to the decay of epithermal neutron populations above two different energy levels to provide values indicative of the kind of fluid present, independent of porosity. The measurement above the higher of these energy levels, approximately 0.4 eV, indicates the existence of hydrogenous fluid, water and hydrocarbons, in the formations; the lower threshold measurement, above approximately 0.15 eV, is indicative of the structure of the molecule in which the hydrogen molecule is bound and the porosity. A pulsed neutron generator in a sonde irradiates the formations with 14 meV neutrons and a pair of detectors, one shielded by cadmium to establish the 0.4 eV threshold energy level and the other, shielded by gadolinium to establish the 0.15 eV threshold energy level, respond to epithermal neutron populations created by irradiation to provide count rate information. Time related parameters of the count rate information, e.g. the decay constants, provided by each detector are derived. The ratio of the respective parameters is used to identify the type of fluid in the formation, independent of porosity. The method and apparatus can determine water saturation, i.e. percentage of water in the formation fluid and can identify specific types of hydrocarbons under 100% hydrocarbon saturation conditions.

17 Claims, 7 Drawing Sheets

METHOD AND APPARATUS FOR EPITHERMAL NEUTRON DECAY LOGGING

BACKGROUND OF THE INVENTION

This invention relates to neutron well logging and more particularly to methods and apparatus for determining, independent of porosity, the nature of hydrogenous fluids present in a formation from characteristics of the epithermal neutron population resulting from irradiation of formations surrounding a well bore with high energy neutrons.

In hydrogenous media, the slowing down time of a high energy neutron to epithermal energy decreases with hydrogen density and is primarily affected by the hydrogen content of the media because of the higher cross section for neutron scattering from hydrogen at epithermal energies and because of the greater average energy loss in elastic scattering from hydrogen. Thus, neutron slowing down time to energies greater than about 0.5 eV is sensitive primarily to formation porosity since the fluid filling the pore spaces, i.e., water and/or hydrocarbons, is hydrogen rich.

As neutron energies decrease below about 0.5 eV, however, further energy loss depends on the type of molecule in which the hydrogen atom is bound. At energy levels between about 0.01 eV and 0.5 eV, the type of molecule in which the hydrogen is bound is the dominant factor in energy loss. Therefore, the slowing down time (die away) of neutrons at energies above about 0.5 eV is primarily sensitive to formation porosity, while at energies between about 0.01 and 0.5 eV, the slowing down time is sensitive to both porosity and the structure of the molecule in which the hydrogen is bound.

The effects of the interaction between high energy neutrons and molecules containing hydrogen atoms in earth formations have been utilized in various ways to obtain valuable information concerning the existence of hydrocarbon deposits in the formations. For example, because hydrogen strongly affects the slowing down of neutrons, and because pores in rock formations are nearly always filled with hydrogenous fluids, detection of the die-away or decay rate of the epithermal neutron population following a burst of high energy neutrons gives a measure of formation porosity.

In addition to porosity determination, it is also important to derive information identifying the nature of the fluid filling the formation pores, i.e., hydrocarbons, water, and the relative quantities of each. Mills, Jr. U.S. Pat. No. 3,497,692 describes a system for determining whether the formation fluid is predominantly oil or water. The differences in count rates of epithermal neutrons having energies above different threshold levels are measured at times following the neutron burst corresponding to the locations of the peaks for 100% water and 100% oil in the formations, respectively. These times depend on the formation porosity and are obtained from calibration curves derived from measurements in formations of known porosity. The differences between the count rates at the respective peak times are then subtracted to indicate the water saturation (Sw) qualitatively. This procedure does not yield a quantitative value for Sw, but a formation fluid which is predominantly water will produce a greater difference at the location of the water peak and vica versa.

A variation on this technique is disclosed in the Mills, Jr., U.S. Pat. No. 4,283,624. The method and apparatus described in this patent employs epithermal neutron die-away (or decay) purportedly to distinguish between free hydrogen, such as is present in oil or water, and hydrogen which is chemically bound to the formation. According to the patent disclosure, epithermal neutron decay rates are measured with two detectors, one having an energy range whose lower limit is below the chemical binding energy of bound hydrogen in the formation, preferably in the range 0.1–1 eV, and the other having an energy range with a lower limit greater than the lower limit of the first detector, preferably in the range 0.5–10 eV. The decay constant measured by the first detector is stated to be indicative of hydrogen in the formation fluids only, while the decay constant measured by the second detector is stated to be indicative of the total hydrogen in the formation, i.e., both in the fluid and bound in the formation. The difference in the decay constants is described as indicating the bound hydrogen porosity.

The patent to Allen et al., No. 4,302,669, discloses a method of identifying fluid content of a formation in which count rates are taken of epithermal neutron populations above two different threshold energies (or with different energy responses) in the energy region below the chemical binding energy of hydrogen in hydrogenous fluid. In addition, count rates are taken during time windows in the thermal equilibrium diffusion period, which count rates are used to correct the count rates determined during the thermalization period to obtain the time constant of the thermalization period. This time constant is used with an independent measurement of porosity to determine saturation Sw.

These known techniques, involving epithermal neutron population measurements above different energy threshold levels, rely on differences between the measurements to provide the results desired, and, where saturation is to be determined, the measured differences are correlated with porosity.

SUMMARY OF THE INVENTION

This invention has as its object, to determine the nature of hydrogenous fluids in earth formations surrounding a well bore independent of formation porosity, thus rendering unnecessary the correlation with porosity required by known techniques.

In accordance with the invention, parameters which characterize the time dependence of the slowing down of epithermal neutrons above two different energy levels resulting from irradiation of the formation by bursts of high energy neutrons, are obtained. The ratios of these characterizing parameters are used to provide indications of water saturation, i.e., the percentages of water and oil in the formation, or, where water saturation is 0%, to characterize the nature of the hydrocarbons present. In both cases, the determinations are independent of formation porosity and provide valuable information without the necessity of taking a porosity log and making calibration curves to correct for the effect of porosity.

The method is carried out by means of a sonde, adapted to be moved through a well bore, carrying a high-energy neutron source, such as a 14 meV D-T generator and a pair of neutron detectors having different threshold energy levels in the epithermal range. Both detectors are of the $^3$He type, one shielded by cadmium to provide a threshold of $>0.4$ eV, and the other shielded by gadolinium to provide a threshold >0.15 eV. The detectors are mounted in a common pad adapted to be pressed against the wall of the well bore during measurement and shielded from neutrons coming from the sonde and borehole.

The neutron generator is pulsed to irradiate the surrounding formations with high energy neutrons and the epithermal neutron counts above each of the respective threshold energies measured. The count rate information is transmitted to the surface and processed by a computer to derive the epithermal decay time constant or other parameters which characterize the time dependence of each of the detector outputs. The ratios of the characterizing parameters are then used to calculate directly an indication of water saturation or hydrocarbon type in the formation under investigation, without the need for a porosity measurement and a calibration curve for the porosity obtained from this measurement.

BRIEF DESCRIPTION OF THE DRAWINGS

The foregoing and other objects, features and advantages of the invention will become apparent from the following detailed description thereof, taken in conjunction with the following drawings, in which.

DETAILED DESCRIPTION OF THE INVENTION

Figures 1, 2:
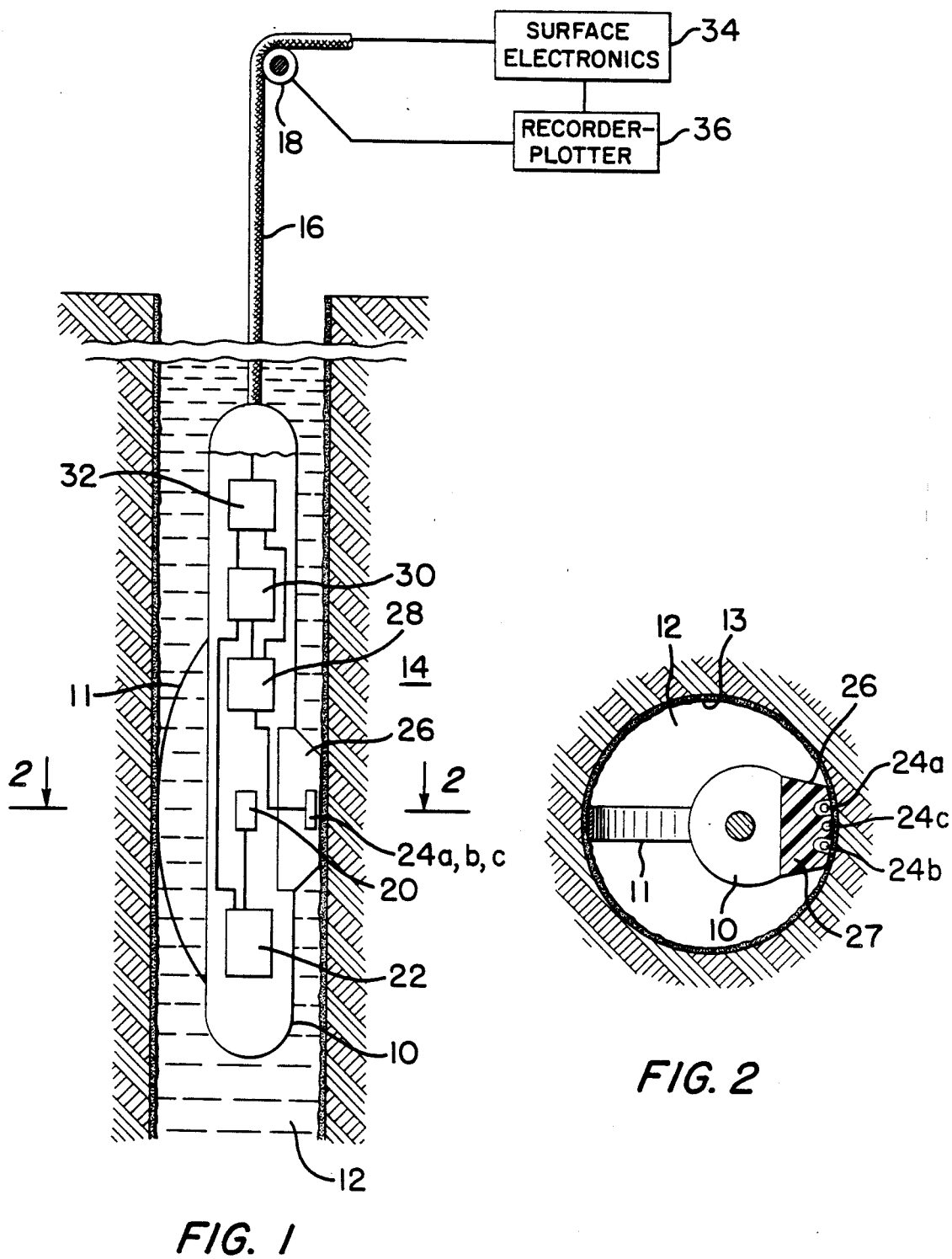
FIG. 1 is a schematic representation of a logging sonde in logging position in a well bore, showing the downhole and surface apparatus of the invention in block form.
FIG. 2 is a cross-section through the sonde of FIG. 1, taken along the line 2—, showing certain details of the neutron detectors of the invention.

Turning now to the drawings, and referring to FIG. 1, an elongated logging sonde 10, of generally circular cross-section, is suspended in a well bore 12 in earth formations 14 by cable 16. The cable 16 extends to the surface where it is wound about the drum of a winch (not shown) which serves to move the sonde 10 through the well bore 12. In conventional fashion, the cable 16 passes over the sheave 18 whose revolutions are counted to give an indication of the depth of the sonde in the well bore.

The basic elements of the sonde are shown in block form in FIG. 1. A pulsed neutron generator 20 of the D-T type, is supplied with its high voltage power supply and controlled by unit 22. For the purpose of the present invention, the neutron generator 20 is preferably of the type which generates discrete pulses of fast neutrons, e.g., 14 meV, and may for example be of the types described in more complete detail in C. Goodman U.S. Pat. No. 2,991,364, dated July 4, 1961, and A. H. Frentrop U.S. Pat. No. 3,546,512, dated Dec. 8, 1970, although any pulsed source producing high energy fast neutrons, e.g., D-D type, may be used. A pair of epithermal neutron detectors 24a, b, and an unshielded thermal neutron detector 24c are housed in a pad 26, which will be described in more detail hereinafter. The outputs of the detectors 24a, b and c are fed to signal processor unit 28, the output of which is supplied to the telemetry unit 30 for transmission to the surface. A programming unit 32 controls the timing and operation of the neutron generator control 22, the signal processing unit 28 and the telemetry unit 30.

The signals, representative of the epithermal neutron count information obtained by the detectors 24a, b, and the thermal neutron count information obtained by detector 24c, are processed by the surface electronics 34, preferably comprising a digital computer, which performs the computations to be described hereinafter. Recorder plotter 36, synchronized with the depth information derived from the sheave 18, receives the output of the unit 34 to produce the plot of the well log.

The details of the downhole and surface circuitry shown in block form in FIG. 1, are more completely shown and described in the copending application of H. H. Loomis et al., for "Methods and Apparatus for Epithermal Neutron Logging", Ser. No. 07/324,776, filed Mar. 16, 1989, and assigned to the same assignee (Docket No. 60.925). As disclosed therein, the circuitry develops electrical signals representative of the detected epithermal neutron counts in digital form, transmits them to the surface, and performs the necessary computation to derive decay time constants or other time-dependent parameters.

To insure that the detectors 24a, b, c, respond only to neutrons from the formations, the pad 26 is kept pressed firmly against the inner wall of the well bore 12, or more precisely the mud cake 13 that forms on the inner wall, by means of bow spring 11. During raising or lowering of the sonde, the bow spring 11 is kept in retracted position within the sonde body, thereby permitting the sonde to move freely through the well bore. When a measurement is desired, the sonde is stopped and the bow spring 11 released to urge the pad 26 into contact with the mud cake 13. The sonde may be held stationary for each measurement or measurements may be made as the sonde is moved through the borehole.

As indicated above, the invention involves the detection of epithermal neutrons above two different energy levels. Consequently, the two detectors 24a, b, in the pad 26 are designed to count epithermal neutrons having energy levels above two different thresholds. Conveniently, both detectors are of the known 3He type but are provided with different shielding to impart the desired threshold responses. Thus, for example, detector 24a is shielded with a layer of cadmium and detector 24b is shielded with a layer of gadolinium, both cadmium and gadolinium having large capture cross sections for neutrons in the epithermal energy region. In a preferred embodiment, detector 24a is shielded with cadmium having a 60 mil thickness, to provide the higher threshold energy level, and detector 24b is shielded with a 2 mil thickness of gadolinium, to provide the lower energy threshold. Detector 24c is unshielded to maximize its sensitivity to thermal neutrons. The counts from detector 24c are used to correct the counts from detectors 24a and 24b for thermal neutron background.

The detectors 24a, b, c, are shielded from bore hole neutrons by being embedded in boron carbide ($B_4C$), preferably incorporated in a hydrogenous medium such as epoxy, in the sonde body and at the ends and edges of the pad in which the detectors are mounted. This shielding is indicated in FIG. 2 by reference numeral 27.

Preferably, as established by the thicknesses of the cadmium and gadolinum shielding on the detectors, the higher energy threshold level (cadmium shielding) is 0.4 eV and the lower energy threshold level (gadolinium shielding,) is 0.15 eV. However, the detector energy thresholds are not limited to those values. The higher energy threshold may be increased to as much 0.5 eV but should not be decreased below 0.3 eV while the lower energy threshold should preferably be in the range of from 0.05 to 0.20 eV.

Figure 3:
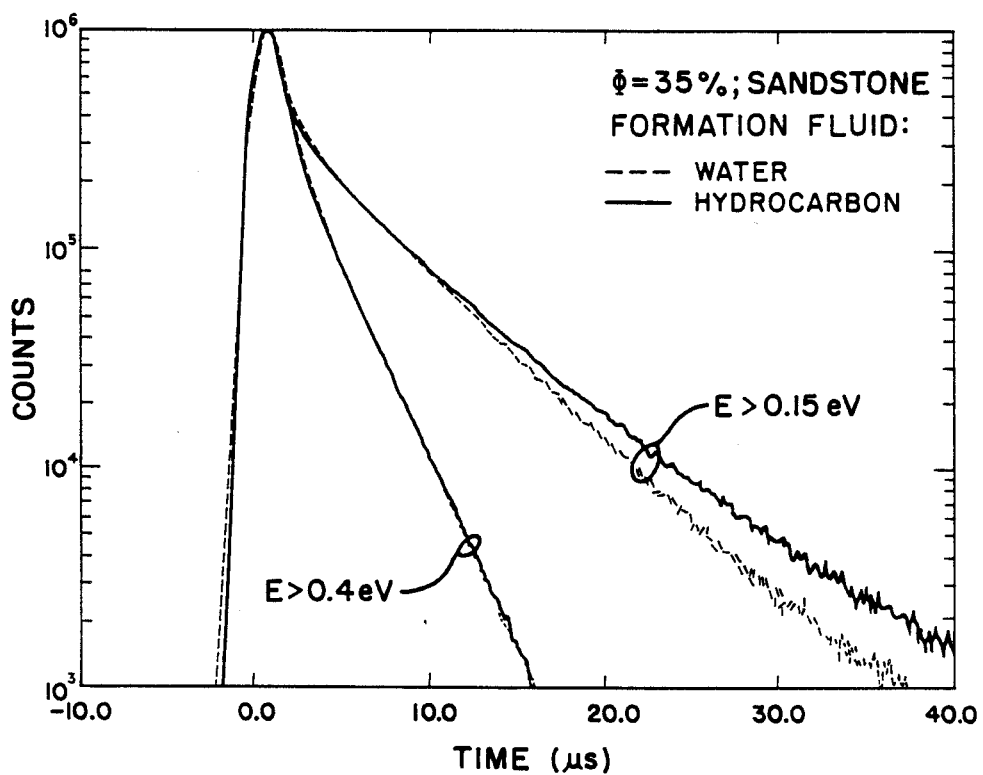
FIG. 3 is a plot of counts versus time (corrected for thermal neutron background) illustrating the differentiation between water and hydrocarbons at different energy levels.
Figure 4:
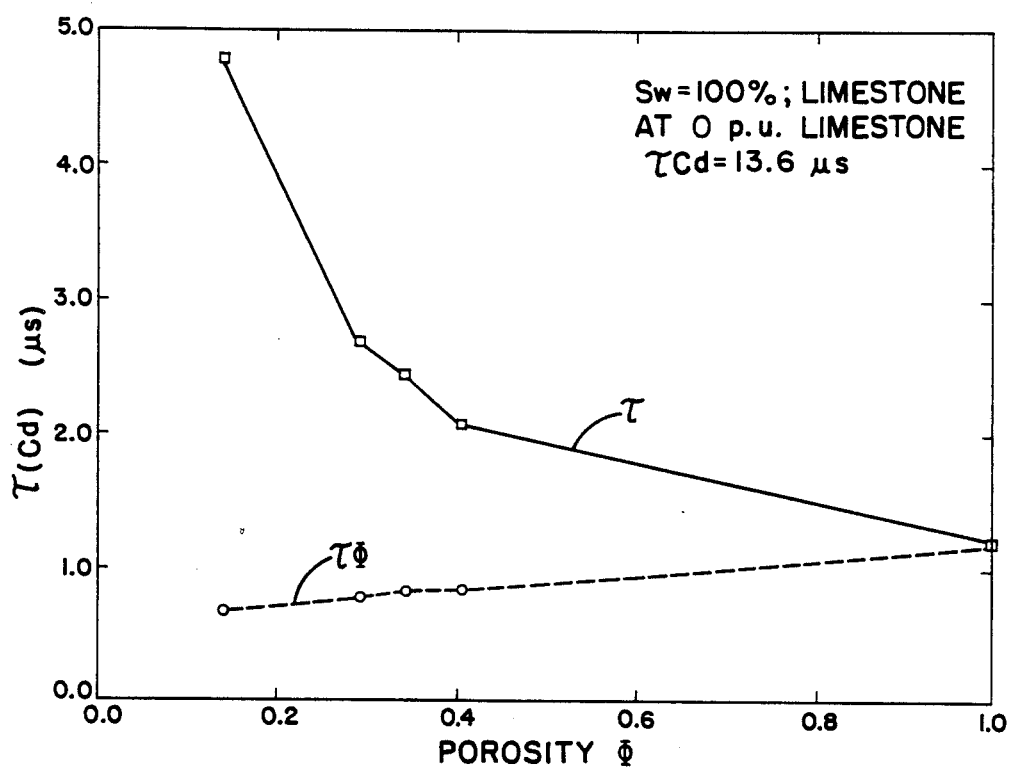
FIG. 4 is a plot of neutron decay time constant versus porosity showing the porosity dependence of single time constant measurements.
Figure 5:
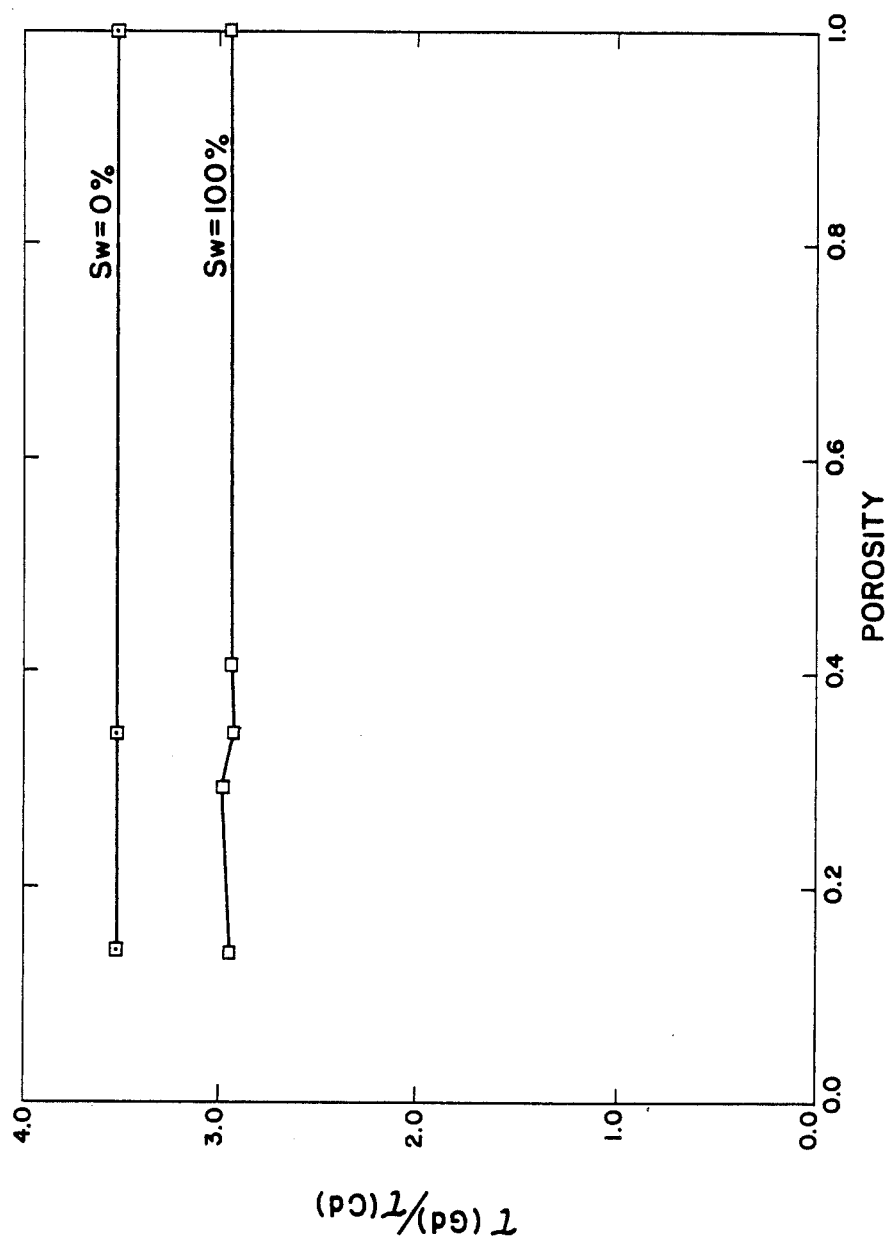
FIG. 5 is a plot of the ratio of the two decay time constant measurements of the invention, showing independence of porosity.

The principles of the invention can best be understood by reference to the curves of FIGS. 3, 4 and 5. FIG. 3 shown neutron flux curves for the high and low energy threshold levels measured in a 35% porous formation containing either fresh water or a hydrocarbon, such as cyclohexane. These curves plot the decays of the epithermal neutron populations as measured above the two threshold energy levels and are corrected for thermal neutron background in a suitable manner responsive to the output of detector 24c, such as disclosed in the aforementioned Loomis et al. application. The curves shows that the decay rates and thus the decay time constants ($\tau$) are very nearly the same for both water and hydrocarbons with the same hydrogen density for an energy threshold greater than 0.4 eV. However, for the lower energy threshold level of 0.15 eV, the decay time constant is greater in the hydrocarbon than in water.

In the case of the hydrocarbon cyclohexane, both cyclohexane and water have essentially the same hydrogen densities, as illustrated by the virtually identical decay curves for energy levels above 0.4 eV. However, differences in the molecular structure and compositions of the molecules between water and cyclohexane affect the respective decay rates differently at energy levels above 0.15 eV, as shown by the separate curves in FIG. 3. Thus, a basis appears for differentiating between a hydrocarbon and water bearing formation by comparing parameters which characterize the time dependence of the decay curves, e.g., the decay time constants.

Heretofore, as evident from the Mills, Jr. and Allen et al patents discussed hereinabove, distinguishing between water and hydrocarbon in a formation has been achieved by taking the difference between epithermal neutron count rates at two threshold energy levels and correlating the differences with formation porosity. The influence of porosity on such measurements is illustrated in the curves of FIG. 4, which plot the decay time constant of epithermal neutrons above the higher threshold level, using a cadmium shielded 3He detector, versus formation porosity measured in laboratory formations in 100% water saturation. The solid line curve ($\tau$) illustrates the variation of the decay time constant with porosity and the lower-dashed line curve ($\tau\phi$), demonstrates that this parameter is not inversely proportional to the porosity since the curve has a positive slope. Thus, as recognized in the abovementioned prior art, known techniques for determining the nature of the hydrogenous fluid in a formation require correlation of epithermal neutron decay measurements with porosity.

For example, using the plots of FIG. 4, water saturation can be determined from the following equation:

$$S_w = 1 - \frac{(\tau_{Gd} - \tau_{Cd})OBS - (\tau_{Gd} - \tau_{Cd})\,100\%}{(\tau_{Gd} - \tau_{Cd})\,0\% - (\tau_{Gd} - \tau_{Cd})\,100\%} \quad (1)$$

where
$S_w$ = water saturation (in %/100)
$\tau_{Gd}$ = decay time constant at energy threshold $>0.15$ eV
$\tau_{Cd}$ = decay time constant at energy threshold $>0.4$ eV
OBS = observed (detected) values
0% = values measured in laboratory formations at 0% saturation
100% = values measured in laboratory formations at 100% saturation Since the differences ($\tau_{Gd} - \tau_{Cd}$) are functions of porosity (see FIG. 4), the differences ($\tau_{Gd} - \tau_{Cd}$) 0% and ($\tau_{Gd} - \tau_{Cd}$) 100% must be measured or known for the same porosity as ($\tau_{Gd} - \tau_{Cd}$) OBS.

Referring now to FIG. 5, the present inventor has discovered that the ratio of the decay time constants of epithermal neutrons at the lower threshold level and at the higher threshold level does not vary with porosity over the porosity range of interest in practice. As seen from FIG. 5, the curves of the ratio of the decay time constants ($\tau_{Gd}/\tau_{Cd}$) at low and high energy levels versus porosity are essentially horizontal lines at both 0% and 100% water saturation. Although the actual values for specific curves shown in FIG. 5 were obtained with detectors shielded by 0.5 mil Gd and 60 mil Cd, rather than the 2 mil Gd and 60 mil Cd shielding of the preferred embodiment, the same relationship, i.e. ratio independent of porosity, is demonstrated by the latter, although at somewhat lower ratio values.

Accordingly, water saturation $S_W$ can be expressed as follows:

$$S_w = 1 - \frac{(\tau_{Gd}/\tau_{Cd})OBS - (\tau_{Gd}/\tau_{Cd})\,100\%}{(\tau_{Gd}/\tau_{Cd})\,0\% - (\tau_{Gd}/\tau_{Cd})\,100\%} \quad (2)$$

where the identification of individual terms is the same as for Equation (1) above The decay time constants may be derived as described in the aforementioned Loomis et al. application, or by any other suitable technique. Equation (2) is readily solved by the digital computer in the surface electronics 34 to provide the saturation values $S_w$.

Using the foregoing Equation (2), the nature of the hydrogenous fluid at any level in a borehole may be determined directly and independently of porosity to provide important qualitative information concerning the fluid content of the formations. Equation (2) assumes that $\tau_{Gd}/\tau_{Cd}$ decreases linearly from $S_w=0\%$ to $S_w=100\%$. If the decrease in $\tau_{Gd}/\tau_{Cd}$ is not linear, a single calibration curve valid for all porosities of interest can be used.

Figure 6:
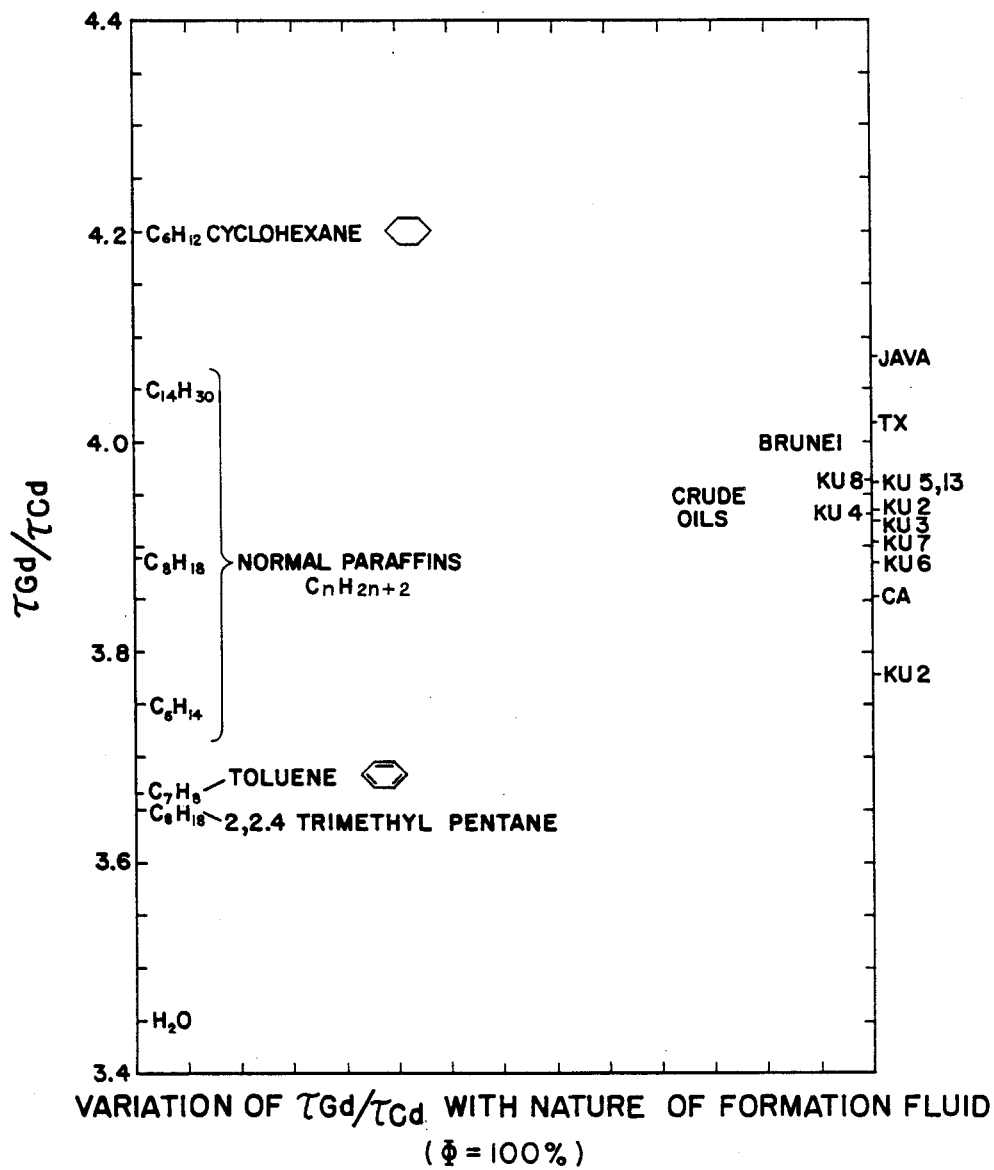
FIG. 6 is a chart illustrating the relationship of the time constant ratio taken in accordance with the invention and the nature of the formation fluid.

The ratio of $\tau_{Gd}/\tau{Cd}$ can also be used to characterize the type of hydrocarbon in the formation. If the formation is known to have 0% water saturation, i.e., 100% hydrocarbon fluid, the different ratios will depend on the nature of the hydrocarbon molecule in which the hydrogen is bound. In FIG. 6, values of the ratio measured in different hydrocarbons and crude oils are shown.

Figure 7:
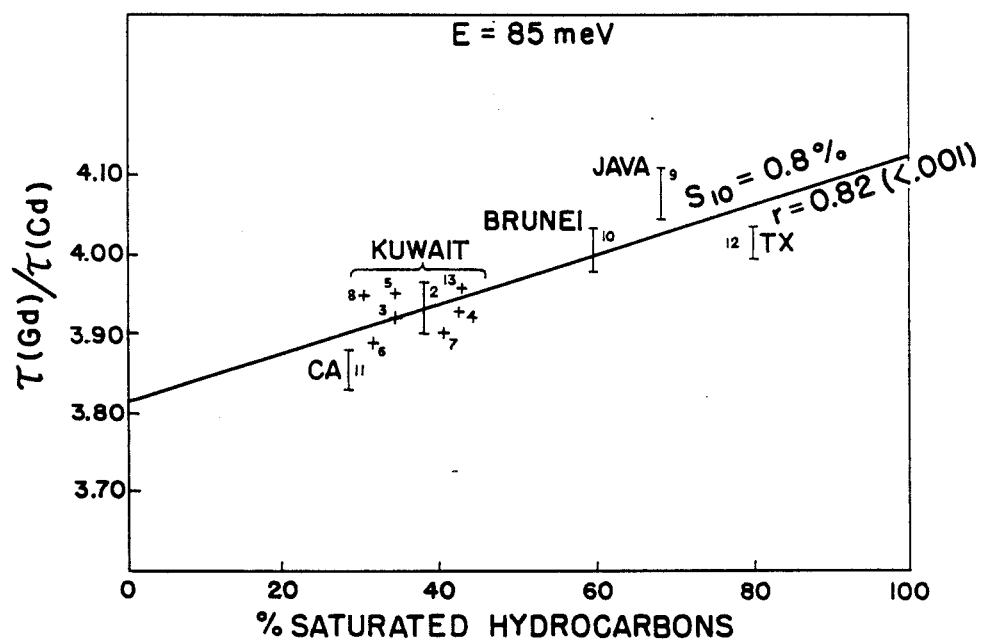
FIG. 7 is a plot of the time constant ratio of the invention versus percent saturated hydrocarbons illustrating application of the invention to identification of different types of hydrocarbon in a formation.

The lowest values of the ratio are found in the aromatic and branched hydrocarbons while the greatest value is in the cyclic hydrocarbon cyclohexane. The n-paraffin hydrocarbons give intermediate values and the ratio increases with the carbon number. The range of values in the crudes is less than in the pure hydrocarbons because the crudes consist of a mixture of a large number of hydrocarbons. Crudes with high aromatic and isoalkane content yield low values of $\tau_{Gd}/\tau_{Cd}$ while high values are obtained in crudes with high cycloalkane (napthene) content. Intermediate values are produced by crudes with high n-paraffin content. It is evident that the $\tau_{Gd}/\tau_{Cd}$ ratio is indicative of the molecular types present in the crude oil. In FIG. 7 this ratio is shown to correlate with the % saturated hydrocarbon (cycloparaffin and n-paraffin) content.

Figure 8A:
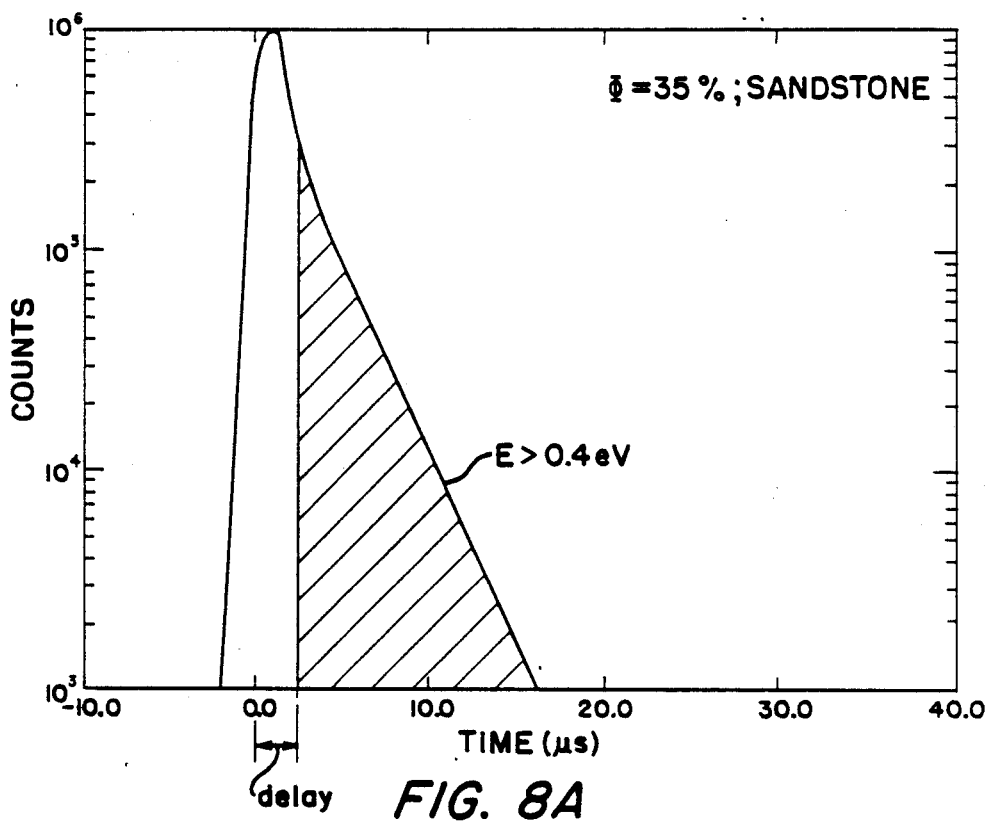
FIGS. 8A and 8B are plots illustrating an embodiment of the invention employing the ratio of the sums of epithermal neutron counts above the two threshold energies measured after delays from the burst which are preselected for each energy.
Figure 8B:
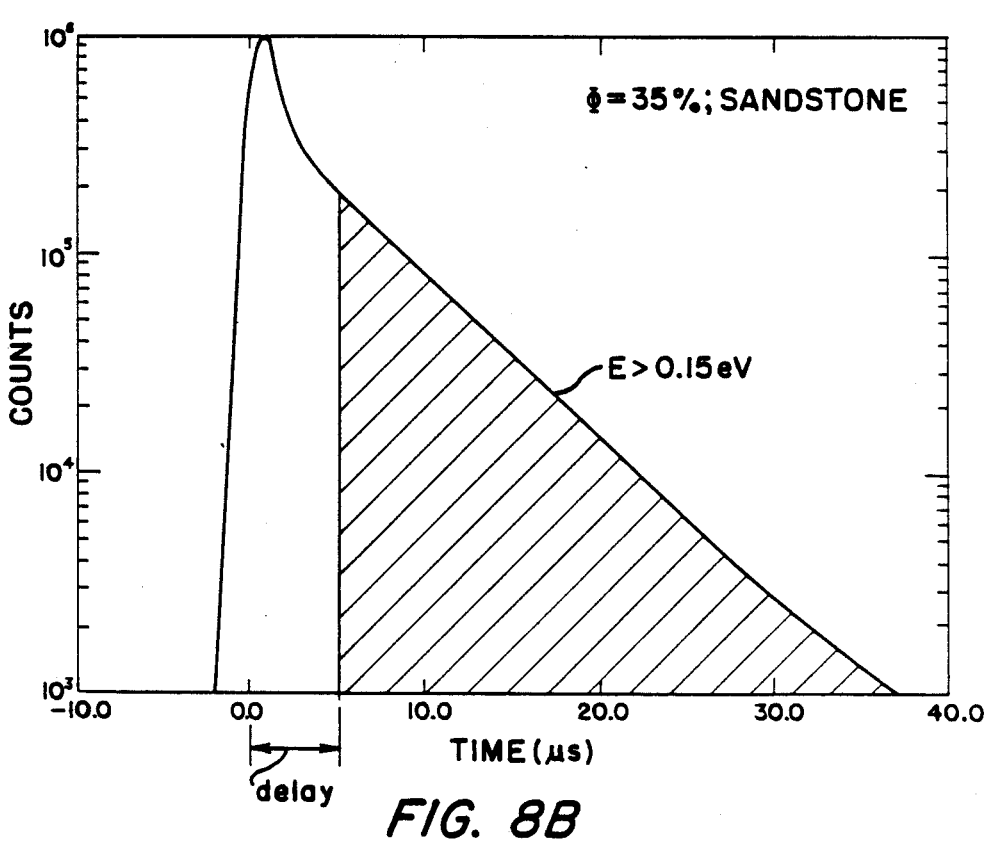

As indicated above, the invention contemplates parameters other than the decay time constant to provide a porosity independent determinations of the nature of the hydrogenous fluids in a formation. Generally, any other parameter that characterizes the time dependence of the flux curves may be used. For example, as illustrated in FIGS. 8A and 8B, the sum of the counts under a normalized flux curve after a predetermined delay which is optimized for each detector cut-off energy can be used to characterize the time dependence of the curve. The ratio of the flux counts measured above the two threshold levels (FIGS. 8A and 8B, respectively) can be used to form count ratios. These count ratios can be used to determine water saturation using Equation (2) above, substituting the count values for the decay time constant values in the equation.

It will be recognized that various modifications of the invention will occur to those skilled in the art and it is intended that the invention be limited only by the scope of the appended claims.

I claim:

1. A method of investigating earth formations surrounding a well bore comprising the steps of
   irradiating the formations with bursts of high energy neutrons to create populations of epithermal neutrons in said formations,
   deriving parameters related to the time dependence of said epithermal neutron populations having energies above preselected different first and second energy levels, respectively, and
   determining from the ratios of said parameters a characteristic of hydrogenous fluids in said formations independently of formation porosity.

2. The method of claim 1 wherein said parameters are the decay time constants of said epithermal neutron populations.

3. The method of claim 1 wherein said parameters are the total numbers of epithermal neutron counts detected during preselected periods of decay of said epithermal neutron populations.

4. A method of investigating earth formations surrounding a well bore comprising the steps of
   irradiating the formations with bursts of high energy neutrons to create populations of epithermal neutrons in said formations,
   deriving parameters related to the time dependence of said epithermal neutron populations having energies above a preselected first energy level in the range of from 0.3 to 0.5 eV and a second energy level in the range of from 0.05 to 0.20 eV, respectively, and
   determining from the ratios of said parameters a characteristic of hydrogenous fluids in said formations.

5. The method of claim 4 wherein said first energy level is 0.4 eV and said second energy level is 0.15 eV.

6. A method of determining water saturation of hydrogenous fluids in earth formations surrounding a well bore comprising the steps of
   irradiating the formations with bursts of high energy neutrons to create populations of epithermal neutrons in said formation,
   deriving parameters related to the time dependence of said epithermal neutron populations having energies above preselected different first and second energy levels, respectively, and
   determining from the ratios of said parameters the water saturation of the hydrogenous fluid in said formations independently of formation porosity.

7. The method of claim 6 wherein said parameters are the decay time constants of said epithermal neutron populations.

8. A method of determining water saturation of hydrogenous fluids in earth formations surrounding a well bore comprising the steps of
   irradiating the formations with bursts of high energy neutrons to create populations of epithermal neutrons in said formations,
   deriving parameters related to the time dependence of said epithermal neutron populations having energies above preselected different first and second energy levels, respectively, wherein said parameters are the decay time constants of said epithermal neutron populations, and
   determining from the ratios of said parameters the water saturation of the hydrogenous fluid in said formations, wherein the water saturation is determined in accordance with the formula:

$$S_w = 1 - \frac{(\tau_{Gd}/\tau_{Cd})OBS - (\tau_{Gd}/\tau_{Cd})\ 100\%}{(\tau_{Gd}/\tau_{Cd})\ 0\% - (\tau_{Gd}/\tau_{Cd})\ 100\%}$$

where:
$S_w$ = water saturation in %/100
$\tau_{Gd}$ = decay time constant of epithermal neutrons above the lower of said first and second energy levels;
$\tau_{Cd}$ = decay time constant of epithermal neutrons above the higher of said first and second energy levels;
OBS = observed (detected) values;
0% = values measured in laboratory formations at 0% saturation;
100% = values measured in laboratory formations at 100% saturation.

9. The method of claim 8, wherein the result obtained by the foregoing formula is calibrated in accordance with the function defining the rate of decrease of $\tau_{Gd}/\tau_{Cd}$ over a range of water saturation Sw between $S_w=0\%$ and $S_w=100\%$.

10. A method of identifying the hydrocarbon constituents of hydrogenous fluids in earth formations surrounding a well bore where said formations are known to have 0% water saturation comprising the steps of
    irradiating the formations with bursts of high energy neutrons to create populations of epithermal neutrons in said formations, deriving parameters related to the time dependence of said epithermal neutron populations having energies above preselected different first and second energy levels, respectively, and determining from the ratios of said parameters the types of hydrocarbons in said formations independently of formation porosity.

11. Apparatus for investigating earth formations surrounding a well bore comprising:

a sonde adapted to be moved through the well bore, means carried by said sonde for irradiating said formations with high energy neutrons, detector means carried by said sonde for determining parameters related to the time dependence of populations of neutrons slowed down by said formations to energies above respective preselected first and second energy levels, and means responsive to the ratio of said parameters at said respective energy levels for indicating a characteristic of hydrogenous fluids in said formations independently of formation porosity.

12. The apparatus of claim 11 wherein said detector means comprises first and second detectors respectively responsive to epithermal neutrons above said first and second energy levels.

13. The apparatus of claim 12 wherein said first and second detectors are mounted in a single pad adapted to be urged against the wall of said well bore.

14. The apparatus of claim 12 wherein said first and second detectors are shielded from neutrons in said well bore by boron carbide.

15. The apparatus of claim 14 wherein the boron carbide is incorporated in a hydrogenous medium such as epoxy.

16. An apparatus for investigating earth formations surrounding a well bore comprising:

a sonde adapted to be moved through the well bore, means carried by said sonde for irradiating said formations with high energy neutrons, detector means carried by said sonde for determining parameters related to the time dependence of populations of neutrons slowed down by said formations to energies above respective preselected first and second energy levels, said detector means comprising first and second detectors respectively responsive to epithermal neutrons above said first and second energy levels, wherein said first detector is responsive to epithermal neutrons having energies above a value between 0.3 and 0.5 eV and said second detector is responsive to epithermal neutrons having energies above a value between 0.05 to 0.20 eV, and means responsive to the ratio of said parameters at said respective energy levels for indicating a characteristic of hydrogenous fluids in said formations.

17. The apparatus of claim 16 wherein said detector means comprises first and second detectors of the 3He type, said first detector being shielded by a layer of cadmium having a thickness of approximately 60 mils, and said second detector being shielded by a layer of gadolinium having a thickness of approximately 2 mils.

* * * * *